(12) United States Patent
Nietling et al.

(10) Patent No.: US 10,224,528 B2
(45) Date of Patent: Mar. 5, 2019

(54) BATTERY ASSEMBLY INCLUDING SPACER

(71) Applicants: Bosch Battery Systems LLC, Orion, MI (US); Robert Bosch GmbH, Stuttgart (DE)

(72) Inventors: David Nietling, Metamora, MI (US); Mehul Botadra, Sterling Heights, MI (US); Kyle Schultz, Oxford, MI (US)

(73) Assignees: Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 237 days.

(21) Appl. No.: 15/185,379

(22) Filed: Jun. 17, 2016

(65) Prior Publication Data

US 2017/0365837 A1    Dec. 21, 2017

(51) Int. Cl.
*H01M 2/10*    (2006.01)
*H01M 2/18*    (2006.01)

(52) U.S. Cl.
CPC ........... *H01M 2/18* (2013.01); *H01M 2/1016* (2013.01); *H01M 2/1077* (2013.01); *H01M 2220/20* (2013.01)

(58) Field of Classification Search
CPC ............................. H01M 2/18; H01M 10/6555
See application file for complete search history.

(56) References Cited

U.S. PATENT DOCUMENTS

| 7,470,485 | B2 | 12/2008 | Kang et al. | |
| 2007/0026303 | A1* | 2/2007 | Jeon | H01M 2/1077 429/143 |
| 2008/0076016 | A1 | 3/2008 | Ghosh et al. | |
| 2014/0023906 | A1* | 1/2014 | Hashimoto | H01M 2/1077 429/120 |
| 2016/0072104 | A1 | 3/2016 | Yamafuku et al. | |

FOREIGN PATENT DOCUMENTS

| JP | 2015118773 A | * | 6/2015 |
| WO | 2015196046 |   | 12/2015 |

OTHER PUBLICATIONS

Machine Translation of JP2015-118773, printed Mar. 18, 2017 (Year: 2017).*

* cited by examiner

*Primary Examiner* — Maria Laios
(74) *Attorney, Agent, or Firm* — Kelly McGlashen; Maginot Moore & Beck LLP

(57) ABSTRACT

A battery module includes a battery module housing, cells disposed in the battery module housing, and spacers disposed between adjacent cells. Each spacer is electrically insulating and includes a body portion having a curvilinear, for example elliptical, outer peripheral shape. The body portion is suspended from the cell housing by hangers, and overlies a central region of a cell housing surface corresponding to large deflection due to cell growth. In addition, the body portion is spaced apart from a periphery of the cell housing surface.

20 Claims, 3 Drawing Sheets

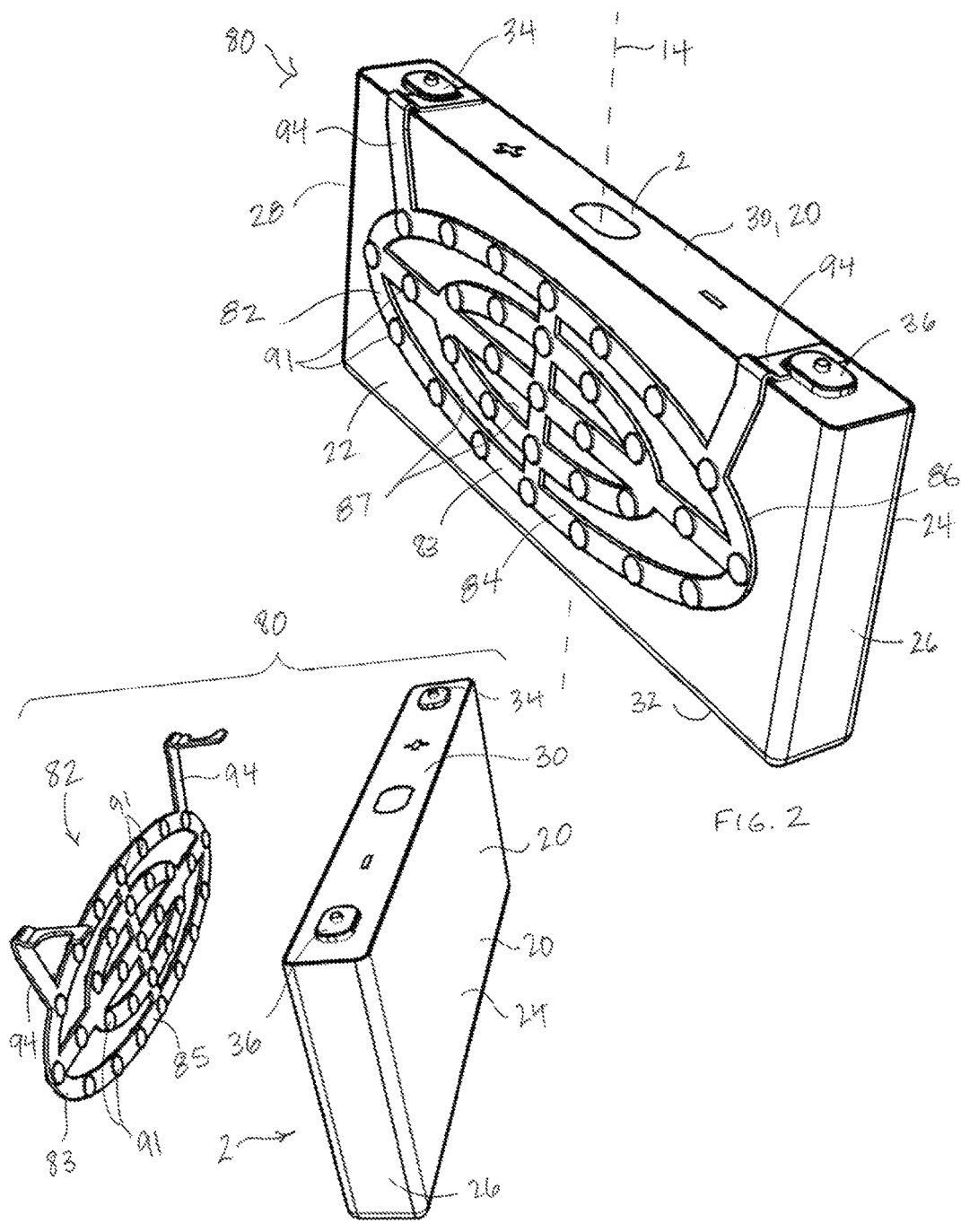

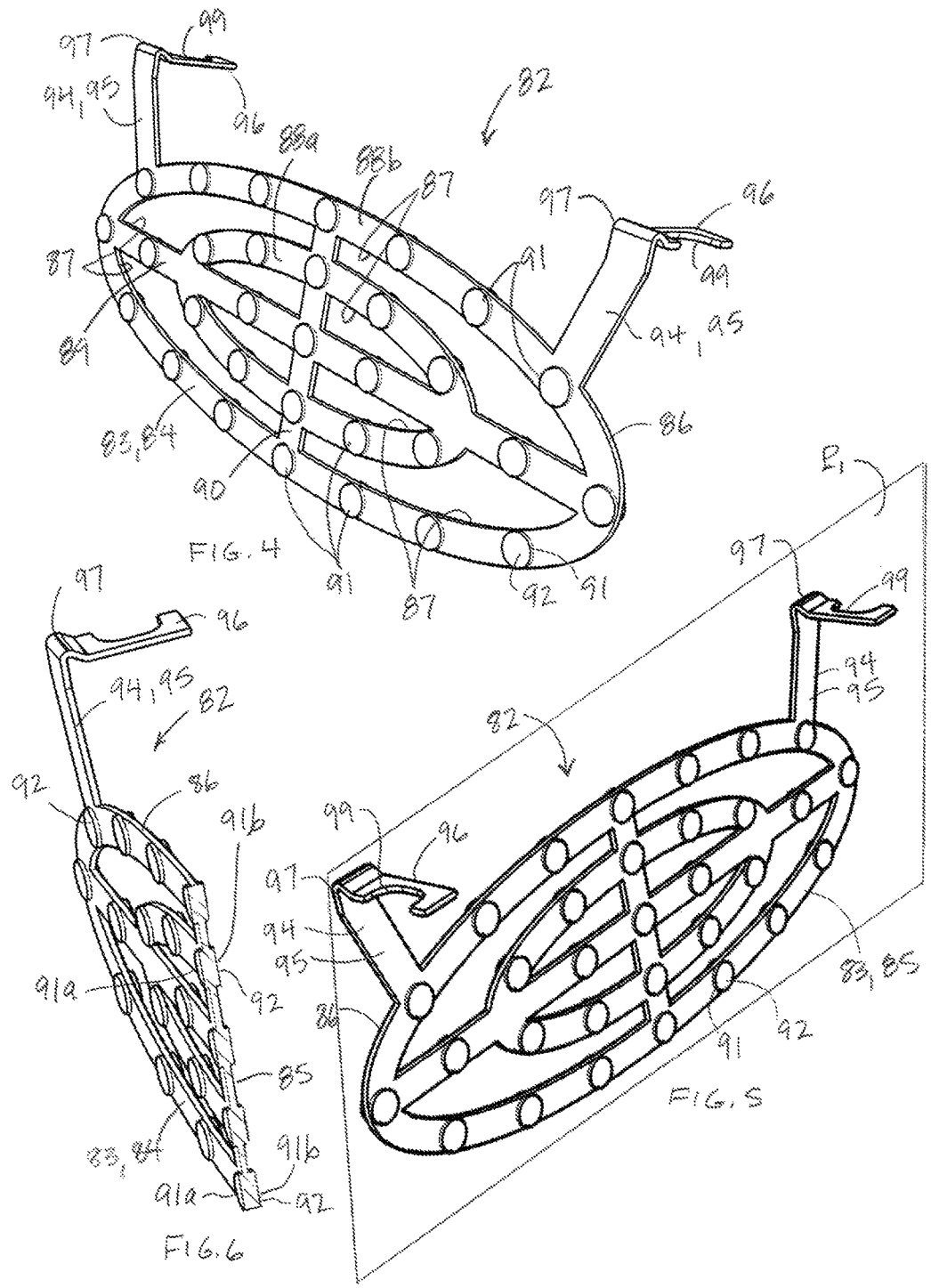

BATTERY ASSEMBLY INCLUDING SPACER

BACKGROUND

1. Field of the Invention

The present disclosure relates to a battery assembly, including a cell having a cell housing, an electrode assembly disposed in the cell housing, and a terminal disposed on an outer surface of the cell housing that is connected to an electrode of the electrode assembly. The battery assembly also includes spacer disposed on an outer surface of the cell housing, the spacer having a curvilinear peripheral shape.

2. Description of the Related Art

Battery packs are power storage devices that provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module may include several electrochemical cells. The cells are arranged are electrically connected in series or in parallel. Likewise, the battery modules within a battery pack are electrically connected in series or in parallel.

SUMMARY

In some aspects, a spacer for maintaining a constant gap between cells of a battery module is described. The spacer includes a body portion is a plate having an elliptical peripheral shape, and a hanger that protrudes from a peripheral edge of the body portion and is configured to mechanically connect the body portion to an external structure. The spacer is formed of an electrically insulating material.

The spacer may include one or more of the following features: The hanger includes a first end, that is connected to the body portion, a second end opposed to the first end, and an angled portion disposed between the first end and the second end, whereby the first end is non-co-planar with the second end. The body portion includes a first side, a second side that is opposed to the first side, and openings that are spaced apart from the peripheral edge of the body portion and extend between the first side and the second side. At least one of the first side and the second side includes protrusions that are spaced apart from each other. For a given protrusion disposed on the first side, another protrusion is disposed on the second side that is aligned with the given protrusion. At least one of the first side and the second side of the body portion includes spaced protrusions having a shape of a thin disk. The openings are configured so that the body portion defines a major axis, a minor axis that extends transverse to the major axis, an inner ellipse that is centered on an intersection of the major and minor axes, and an outer ellipse that surrounds, and is concentric with, the inner ellipse. The hangers are configured to locate the position of the body portion relative to an external structure in three orthogonal directions.

In some aspects, a battery assembly includes a cell and a spacer supported on the cell. The cell includes a housing; an electrode assembly disposed in the housing; and a terminal that is disposed on an outer surface of the housing and electrically connected to an electrode of the electrode assembly. In addition, the spacer is disposed on the outer surface of the housing and includes a body portion having an elliptical peripheral shape.

The battery assembly may include one or more of the following features: The spacer includes a hanger that protrudes from the body portion, and the spacer is suspended from the terminal via the hanger. The hanger includes a first end that is connected to the body portion, a second end opposed to the first end, and a recess that is positioned closer to the second end than the first end, the recess configured to engage the terminal. The body portion has a first side that faces the housing, a second side that is opposed to the first side, and openings that are spaced apart from the peripheral edge of the body portion and extend between the first side and the second side. At least one of the first side and the second side of the body portion includes protrusions that are spaced apart from each other. The spacer is formed of an electrically insulating material. The dimensions of the spacer are smaller than corresponding dimensions of the outer surface such that a peripheral edge of the spacer is spaced apart from a peripheral edge of the outer surface.

In some aspects, a battery module includes a battery module housing, cells disposed in the battery module housing, and a spacer disposed between a pair adjacent cells. The cells each include a housing; an electrode assembly disposed in the housing; and a terminal that is disposed on an outer surface of the housing and electrically connected to an electrode of the electrode assembly. The spacer includes a body portion having an elliptical outer peripheral shape.

The battery module may include one or more of the following features: The dimensions of the body portion are smaller than corresponding dimensions of the outer surface such that a peripheral edge of the spacer is spaced apart from a peripheral edge of the outer surface. The spacer is suspended from the terminal via a hanger. The hanger includes a first end that is connected to the body portion, a second end opposed to the first end, and an angled portion disposed between the first end and the second end whereby the first end is non-co-planar with the second end. The hanger is configured to locate the position of the body portion relative to the cell in three orthogonal directions. The body portion includes a first side, a second side that is opposed to the first side, and openings that are spaced apart from the peripheral edge of the body portion and extend between the first side and the second side. At least one of the first side and the second side includes protrusions that are spaced apart from each other. For a given protrusion disposed on the first side, another protrusion is disposed on the second side that is aligned with the given protrusion. The openings are configured so that the body portion defines a major axis, a minor axis that extends transverse to the major axis, an inner ellipse that is centered on an intersection of the major and minor axes, and an outer ellipse that surrounds, and is concentric with, the inner ellipse.

In some aspects, a battery assembly includes prismatic cells that can be arranged side-by-side in a battery pack housing. In some, but not all, embodiments, the prismatic cells have a metal housing and thus may have an electric charge due to contact between the electrolyte disposed in the cell and the cell housing. The battery assembly includes an electrically insulating spacer that is disposed on an outer surface of the cell housing, for example on a broad side of the cell housing, so that when the cells are arranged side-by-side, the spacer is disposed between adjacent cells, and prevents contact between adjacent cells. The spacer is shaped and dimensioned to correspond to a region of maximum swelling of the side of the cell housing, which may occur due to cell growth. In some embodiments, the spacer is suspended from a peripheral edge thereof so as to overlie a central portion of the side of the cell housing, that is, the region corresponding to the a region of maximum swelling of the side of the cell housing, while being spaced from peripheral edge of the side of the cell housing.

The spacer is formed of a material that is electrically nonconductive, and includes body portion having a curvilinearly shaped peripheral edge. The body portion peripheral edge may be, for example, elliptically shaped. The spacer also includes a hanger that extends outward from a peripheral edge of the body portion and wraps around a side edge of the cell housing. In particular, the hanger extends between a terminal that is disposed on a first side of the cell, and the body portion that overlies a second side of the cell, where the second side is transverse to the first side. The body portion of the spacer is suspended by the hanger such that the body portion overlies the region of maximum swelling. The hanger includes recesses, and the terminals are disposed in the recesses such that the hangers locate the spacer relative to the cell housing in three orthogonal directions.

BRIEF DESCRIPTION OF THE DRAWINGS

FIG. 2 is a perspective view of a battery assembly including a cell and spacer disposed on the cell.
FIG. 3 is an exploded perspective view of the battery assembly of FIG. 2.
FIG. 4 is a front perspective view of the spacer of FIG. 2.
FIG. 5 is a rear perspective view of the spacer of FIG. 2.
FIG. 6 is a cross sectional view of the spacer of FIG. 2.

DETAILED DESCRIPTION

Figure 1:
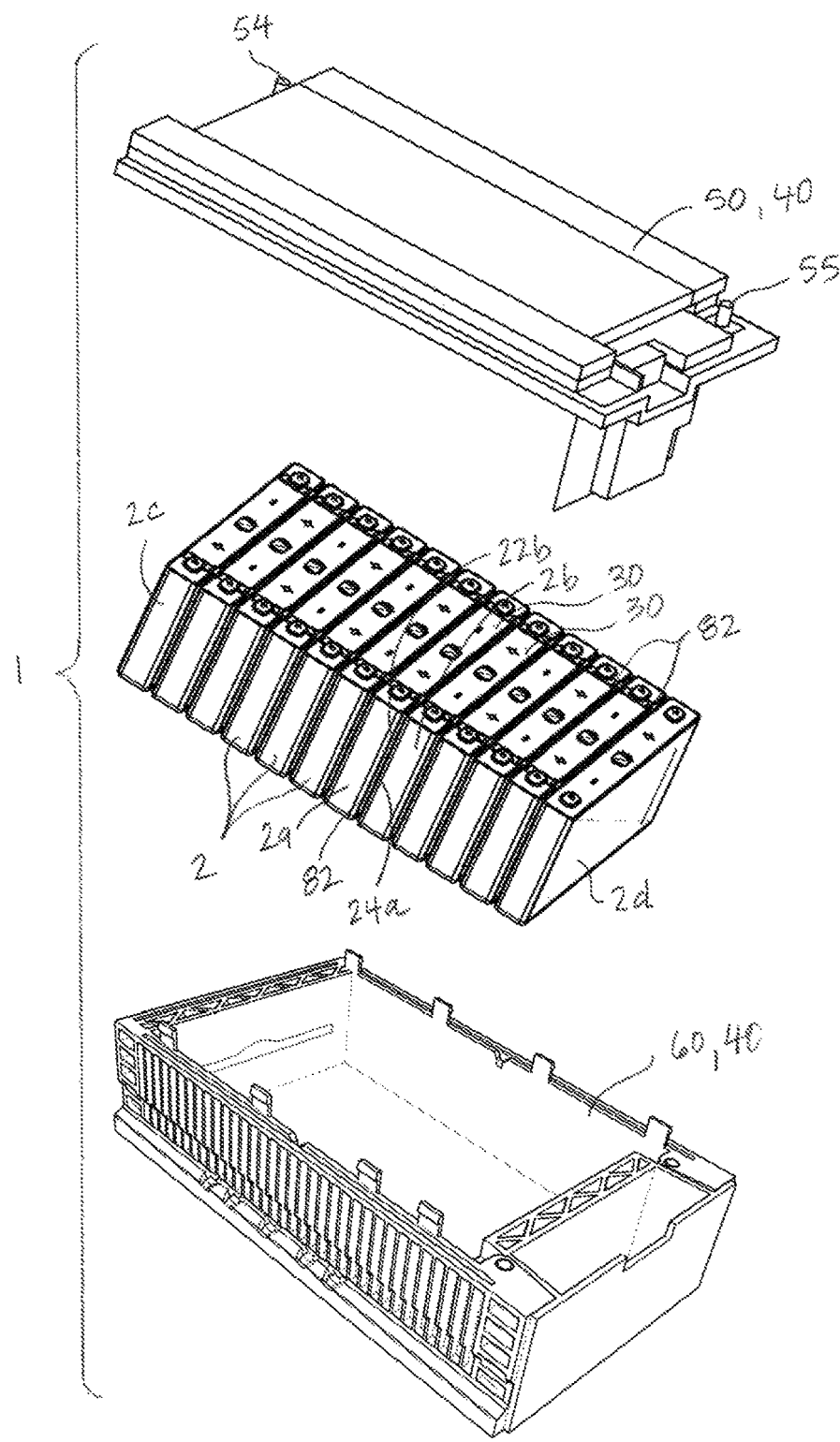
FIG. 1 is an exploded perspective view of a battery pack.

Referring to FIG. 1, a battery pack 1 is a power supply and storage device that includes an array of electrochemical cells 2 that are electrically interconnected and stored in an organized manner within a battery pack housing 40. The battery housing 40 includes a container 60 and a lid 50 that closes an open end of the container 60. Within the battery pack housing 40, the cells 2 are electrically connected in series or in parallel to battery pack terminals 54, 55 that protrude from the lid 50. Electrically insulating spacers 82 are interposed between each pair of adjacent cells 2 in order to maintain a constant gap between adjacent cells 2. Each spacer 82 is supported on a single cell 2 in such a way that the position of the spacer 82 is located relative to the cell 2 in three orthogonal directions, as discussed further below.

Referring to FIGS. 2-3, a spacer 82 and the corresponding cell 2 that supports it together form a battery assembly 80. The cell 2 is a lithium-ion cell that includes a cell housing 20 that encloses an electrode assembly (not shown) and an electrolyte (not shown) to form a power generation and storage unit. The electrode assembly includes at least one positive electrode, at least one negative electrode, and an electrically insulative separator disposed between the positive and negative electrodes. The electrodes and separator are elongate strips of material that are stacked and then wound about a mandrel to form a jelly roll assembly.

The cell housing 20 has a rectangular prism shape (e.g., prismatic), and includes a first side 22, and a second side 24 opposed to the first side 22, a third side 26 adjoining the first side 22 and the second side 24, and a fourth side 28 opposed to the third side 26 and adjoining the first side 22 and the second side 24. The first and second sides 22, 24 have the same height as the third and fourth sides 26, 28, but have a larger width. For example, in the illustrated embodiment, the width of the first and second sides 22, 24 is about twice the height, whereas the width of the third and fourth sides 26, 28 is about one-fourth of the height. In addition, the cell housing 20 includes a first end 30 through which a positive terminal 34 and a negative terminal 36 protrude, and a second end 32 opposed to the first end. The positive terminal 34 is electrically connected to the positive electrode, and the negative terminal 36 is electrically connected to the negative electrode. The electrode assembly is disposed in the cell housing 20 such that the winding axis 14 (e.g., the axis about which the electrodes and separators are wound) extends through the first and second ends 30, 32.

The electrode assembly experiences dimensional changes during battery charge and discharge. This is due at least in part to expansion of the layered structure of the positive and negative electrodes in the electrode thickness direction due to expansion of the active materials during cycling. The expansion of the jelly roll electrode assembly within the cell housing 20 results in "cell growth", which corresponds to the outward bowing of the first and second sides 22, 24 of the cell housing 20 in a direction transverse to the winding axis and normal to an outer surface of the first and second sides 22, 24.

In some embodiments, the battery pack housing may include features which accommodate the growth of the cells 2 disposed therein. Additionally, or alternatively, the spacers 82 are provided between adjacent cells 2 in order to maintain a constant gap between adjacent cells 2, thereby preventing adjacent cells from contacting each other regardless of cell growth.

Referring also to FIGS. 4-6, each spacer 82 is formed of a thin, electrically insulative sheet material such as nylon, and includes a body portion 83 and a pair of hangers 94 that protrude from a peripheral edge of the body portion 83. The body portion 83 resides in a plane P1, and includes a first side 84 that is parallel to the plane P1, a second side 85 that is opposed to the first side 84, and a peripheral edge 86 that extends between the first and second sides 84, 85. The peripheral edge 86 has an elliptical shape. The body portion 83 is formed having openings 87 that extend between the first and second sides 84, 85 at a location spaced apart from the peripheral edge 86. The openings 87 are irregular in shape, and are configured so that the body portion defines a major axis 89 of the elliptical peripheral shape, a minor axis 90 of the elliptical peripheral shape, an inner ellipse 88a and an outer ellipse 88b. The major axis 89 is transverse to the minor axis 90. In addition, the inner ellipse 88a is centered on an intersection of the major axis 89 and the minor axis 90, and the outer ellipse 88b surrounds, and is concentric with, the inner ellipse 88a.

In some embodiments, the body portion 83 also includes protrusions 91 that protrude outward from each of the first and second sides 84, 85 in a direction normal to the corresponding first or second side 84, 85. Each protrusion 91 terminates in a flat surface 92 that is parallel to the plane P1. Although the protrusions 91 are illustrated as having the shape of a thin disc, that is, a circular shape and having a height that is less than their diameter, they are not limited to having this shape. The protrusions 91 on a given one of the first and second sides are spaced apart from each other and are provided on each of the major axis 89, the minor axis 90, the inner ellipse 88a and the outer ellipse 88b. In addition, for each protrusion 91a disposed on the first side 84, another protrusion 91b is disposed on the second side 85 that is aligned, in a direction normal to the plane P1, with the protrusion 91a on the first side 84. The number of protrusions 91 provided may be greater or fewer than the number illustrated, and is determined by the requirements of the specific application.

The hangers 94 are used to mechanically connect the body portion 83 to an external structure such as the cell 2, and more particularly to suspend the body portion 83 from the cell 2 such that position of the body portion 83 is fixed (e.g., located) relative to the cell 2 in three orthogonal directions. To this end, each hanger 94 has an L shape, and includes a hanger first end 95 that is connected to the body portion peripheral edge 86 and resides in the plane P1, and a hanger second end 96 that is opposed to the hanger first end 95 and spaced apart from the body portion 83. Each hanger 94 includes an angled portion 97 that is disposed between the hanger first and second ends 95, 96. At the angled portion 97, each hanger 94 is angled approximately 90 degrees so that the hanger second end 96 resides in a plane that is generally transverse to the plane P1. Each hanger 94 includes a recess 99 that is disposed between the angled portion 97 and the hanger second end 96. The recess 99 is provided in an outward lateral edge of the hanger second end 96, and is shaped and dimensioned to receive, and engage with, a terminal 34, 36 of the cell 2.

The pair of hangers 94 protrude from the body portion peripheral edge 86 adjacent opposed ends of the major axis 89. In addition, although the hangers 94 protrude in generally the same direction, they are slightly diverging such that the hanger second ends 96 are more widely spaced apart than the hanger first ends 95.

In use, the spacer 82 is disposed on the cell 2 such that the hanger second end 96 overlies the cell first end 30, and the terminals 34, 36 are received in a corresponding recess 99. In addition, the body portion 83 is suspended via the hangers 94 such that the body portion second side 85 faces, and overlies, the cell first side 22. The hanger first end 95 is dimensioned so that the body portion 83 is generally centered on the cell first side 22. In this position, the body portion 83 overlies the region of the cell housing 20 that experiences the largest deflections due to cell growth of any portion of the cell housing 20, while simultaneously being spaced from the peripheral portions and corners of the cell first side 22.

Referring again to FIG. 1, the array of cells 2 is disposed in the container 60 of the battery pack housing 40. The array includes a single row of cells 2 arranged side-by-side forming a 1×n array in which n corresponds to the number of cells in the array. For example, in the illustrated embodiment, n equals 12. In the array, the second side 24a of one cell 2a faces the first side 22b of the adjacent cell 2b, and the first end 30 of each cell faces the lid 50. A spacer 82 is disposed between facing surfaces of each pair of adjacent cells 2 in order to maintain a constant gap between adjacent cells 2. Since the container 60 of the battery pack housing 40 is formed of an electrically insulative material, no spacers 82 are provided on the outward-facing sides of the outermost cells 2c, 2d of the array. As a result, the battery pack 1 includes n−1 battery assemblies 80.

In some embodiments, the hangers 94 are used to locate the spacer 82 during, assembly of cell array within the battery pack housing 40. Once the cells 2 are arranged in the container 60 with the spacers 82 disposed between adjacent cells, the spacers 82 are held in position between adjacent cells 2 via cell compression force due to close packing of the cells 2 within the container 60.

Although the cells 2 are described as housing the electrode assembly having a jelly roll electrode configuration, the electrode assembly is not limited to this electrode configuration. For example, the electrode assembly may include a stacked or folded arrangement of electrode plates, or other suitable electrode arrangement.

Although the cells 2 are described as being lithium ion cells, the cells 2 are not limited to this type of cell. For example, the cells 2 may include different combinations of electrode materials and electrolytes, including lead-acid, nickel cadmium (NiCd), nickel metal hydride (NiMH), and lithium ion polymer.

Although the illustrated embodiment includes twelve cells 2 in the cell array, the battery pack 1 is not limited to having twelve cells 2. The number of cells used may be greater or fewer than twelve, and is determined by the requirements of the specific application.

Selective illustrative embodiments of the battery system including the battery pack and the battery assemblies disposed therein are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery system been described above, the battery pack and/or battery assemblies are not limited to the working examples described above, but various design alterations may be carried out without departing from the devices as set forth in the claims.

What is claimed is:

1. A spacer for maintaining a constant gap between cells of a battery module, the spacer comprising
   a body portion is a plate having an elliptical peripheral shape, and
   a hanger that protrudes from a peripheral edge of the body portion and is configured to mechanically connect the body portion to an external structure,
   wherein the spacer is formed of an electrically insulating material.

2. The spacer of claim 1, wherein the body portion resides in a plane, and the hanger that includes
   a first end that is connected to the body portion and protrudes from the peripheral edge so that the first end extends within the plane,
   a second end opposed to the first end, and
   an angled portion disposed between the first end and the second end whereby the first end is non-co-planar with the second end.

3. The spacer of claim 1, wherein the body portion includes
   a first side,
   a second side that is opposed to the first side, and
   openings that are spaced apart from the peripheral edge of the body portion and extend between the first side and the second side.

4. The spacer of claim 3, wherein at least one of the first side and the second side includes protrusions that are spaced apart from each other.

5. The spacer of claim 4, wherein for a given protrusion disposed on the first side, another protrusion is disposed on the second side that is aligned with the given protrusion.

6. The spacer of claim 3, wherein the openings are configured so that the body portion defines a major axis, a minor axis that extends transverse to the major axis, an inner ellipse that is centered on an intersection of the major and minor axes, and an outer ellipse that surrounds, and is concentric with, the inner ellipse.

7. The spacer of claim 1, wherein the hanger comprises a pair of hangers that are configured to locate the position of the body portion relative to an external structure in three orthogonal directions.

8. A battery assembly comprising a cell and a spacer supported on the cell, wherein the cell includes
 a housing;
 an electrode assembly disposed in the housing; and
 a terminal that is disposed on an outer surface of the housing and electrically connected to an electrode of the electrode assembly; and
the spacer is disposed on the outer surface of the housing and includes a body portion having an elliptical peripheral shape.

9. The battery assembly of claim 8 wherein the spacer includes a hanger that protrudes from the body portion, and the spacer is suspended from the terminal via the hanger.

10. The battery assembly of claim 9, wherein the hanger includes
 a first end that is connected to the body portion,
 a second end opposed to the first end, and
 a recess that is positioned closer to the second end than the first end, the recess configured to engage the terminal.

11. The battery assembly of claim 8, wherein the body portion has a first side that faces the housing, a second side that is opposed to the first side, and openings that are spaced apart from the peripheral edge of the body portion and extend between the first side and the second side.

12. The battery assembly of claim 11, wherein at least one of the first side and the second side of the body portion includes protrusions that are spaced apart from each other.

13. The battery assembly of claim 8, wherein the spacer is formed of an electrically insulating material.

14. The battery assembly of claim 8, wherein dimensions of the spacer are smaller than corresponding dimensions of the outer surface such that a peripheral edge of the spacer is spaced apart from a peripheral edge of the outer surface.

15. A battery module comprising a battery module housing, cells disposed in the battery module housing, and a spacer disposed between a pair adjacent cells, wherein the cells each include
 a housing;
 an electrode assembly disposed in the housing; and
 a terminal that is disposed on an outer surface of the housing and electrically connected to an electrode of the electrode assembly,
wherein the spacer includes a body portion having an elliptical outer peripheral shape.

16. The battery module of claim 15 wherein the spacer is suspended from the terminal via a hanger.

17. The battery module of claim 16, wherein the body portion resides in a plane, and the hanger includes
 a first end that is connected to the body portion and protrudes from the peripheral edge so that the first end extends within the plane,
 a second end opposed to the first end, and
 an angled portion disposed between the first end and the second end whereby the first end is non-co-planar with the second end.

18. The battery module of claim 16, wherein the hanger comprises a pair of hangers that are configured to locate the position of the body portion relative to the cell in three orthogonal directions.

19. The battery module of claim 15, wherein the body portion includes
 a first side,
 a second side that is opposed to the first side, and
 openings that are spaced apart from the peripheral edge of the body portion and extend between the first side and the second side.

20. The battery module of claim 19, wherein at least one of the first side and the second side includes protrusions that are spaced apart from each other.

\* \* \* \* \*